(12) United States Patent
Sheffler et al.

(10) Patent No.: US 8,054,311 B1
(45) Date of Patent: Nov. 8, 2011

(54) RIG BAKING FOR ARBITRARY DEFORMERS

(75) Inventors: William F. Sheffler, Hercules, CA (US); Michael Comet, San Ramon, CA (US); John Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 12/729,033

(22) Filed: Mar. 22, 2010

Related U.S. Application Data

(63) Continuation-in-part of application No. 12/408,585, filed on Mar. 20, 2009, which is a continuation-in-part of application No. 12/021,289, filed on Jan. 28, 2008, now Pat. No. 7,570,264, which is a continuation of application No. 10/844,048, filed on May 11, 2004, now Pat. No. 7,333,112.

(60) Provisional application No. 60/470,590, filed on May 14, 2003, provisional application No. 60/470,767, filed on May 14, 2003.

(51) Int. Cl.
    *G06T 13/00* (2006.01)
(52) U.S. Cl. .......... 345/473; 345/419; 345/420
(58) Field of Classification Search .......... None
    See application file for complete search history.

(56) References Cited

U.S. PATENT DOCUMENTS

| | | | | |
|---|---|---|---|---|
| 5,731,821 A | * | 3/1998 | Girard | 345/474 |
| 5,796,400 A | * | 8/1998 | Atkinson et al. | 345/420 |
| 6,184,901 B1 | * | 2/2001 | Silva et al. | 345/474 |
| 6,285,794 B1 | * | 9/2001 | Georgiev et al. | 382/243 |
| 2003/0231181 A1 | * | 12/2003 | Rose et al. | 345/473 |

OTHER PUBLICATIONS

Wang, X., Phillips, C., Multi-weight enveloping: least-squares approximation techniques for skin animation, Jul. 2002, Proceedings of the 2002 ACM SIGGRAPH/Eurographics symposium on Computer animation, pp. 129-138.*

* cited by examiner

*Primary Examiner* — Said Broome
(74) *Attorney, Agent, or Firm* — Kilpatrick Townsend & Stockton LLP

(57) ABSTRACT

Methods, systems, and articles of manufacture are disclosed for creating posed models. In various embodiments, deformations resulting from posing a model can be represented in a set of training poses. The sets of training poses for the model and a desired target pose (e.g., a simulated or sculpted pose) can be used to create a final pose for the model. Arbitrary deformer activation weights can be determined by projecting a target pose onto the set of training poses. The deformer activation weights can be applied to one or more deformers to approximate the desired pose.

21 Claims, 6 Drawing Sheets

RIG BAKING FOR ARBITRARY DEFORMERS

CROSS-REFERENCES TO RELATED APPLICATIONS

This application is a Continuation-In-Part of commonly owned and U.S. patent application Ser. No. 12/408,585 filed Mar. 20, 2009 and entitled "Methods and Apparatus for Export of Animation Data to Non-Native Articulation Schemes," which is a Continuation-In-Part of U.S. patent application Ser. No. 12/021,289 filed Jan. 28, 2008 and entitled "Rig Baking," now U.S. Pat. No. 7,570,264; which is a Continuation of U.S. patent application Ser. No. 10/844,048 filed May 11, 2004 and entitled "Rig Baking," now U.S. Pat. No. 7,333,112; which claims the benefit of and priority to U.S. Provisional Patent Application No. 60/470,590 filed May 14, 2003 and entitled "Rig Baking," and U.S. Provisional Patent Application No. 60/470,767 filed May 14, 2003 and entitled "Defrobulation."

This Application is related to the following commonly owned applications:

U.S. patent application Ser. No. 10/844,049 filed May 11, 2004 and entitled "Defrobulated Angles for Character Joint Representation," now U.S. Pat. No. 7,259,764;

U.S. patent application Ser. No. 11/582,704 filed Oct. 17, 2006 and entitled "Statistical Dynamic Modeling Method and Apparatus," now U.S. Pat. No. 7,515,155;

U.S. patent application Ser. No. 10/766,515 filed Jan. 27, 2004 and entitled "Integrated object squash and stretch method and apparatus," now U.S. Pat. No. 7,221,379;

which are hereby incorporated by reference for all purposes.

BACKGROUND

This disclosure relates to computer-generated imagery (CGI) and computer-aided animation. More specifically, this disclosure relates to optimizing the performance of arbitrary deformers such that they can be executed in a reasonable time without consuming undue computing resources in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images is the can be the balancing of a desire for a highly-detailed image of a character or other object with the practical issues involved in allocating the resources (both human and computational) required to produce those visually appealing images.

A realistic looking character model is often extremely complex, having millions of surface elements and hundreds or thousands of attributes. Due to the complexity involved with animating such models, animation tools often rely on armatures and animation variables to define character animation. For example, an armature may be a "stick figure" representing a character's pose, or bodily position. By moving armature segments, which are the "sticks" of the "stick figure," an armature can be manipulated into a desired pose. As an armature is posed by an animator, animation tools may modify an associated character model so that the bodily attitude of a character roughly mirrors that of the armature.

Animation variables can be another way of defining a character animation of a complex character model. Animation variables can include parameters for functions that modify the appearance of a character model. Animation variables and their associated functions can be used to abstract complicated modifications to a character model to a relatively simple control. Animation variables and their associated functions may manipulate armature segments, thereby altering the appearance of a character model indirectly, or manipulate a character model directly, bypassing the armature.

Functions associated with animation variables, referred to as model components, can be used to create a variety of realistic and artistic effects. For example, model components can be used to create layers of bones, muscle, and fat beneath the surface of a character model, so that the surface or skin of a character model deforms either realistically or as desired as it is posed. Model components can also be used to simulate the movement of non-rigid features, such as hair and cloth. In addition to replicating specific physical phenomena, model components can be used to manipulate a character model according to an algorithm or procedure, such as sculpted shapes, metaballs, and physics simulations.

Model components can be extremely complex and therefore time-consuming to execute. To create artistically effective character animation, an animator may often create a rough version of a scene and then repeatedly fine-tune a character animation to create desired drama and expression of the final scene. The time needed to execute model components as animators pose and repose character models can hinder the efficiency of the animator during this artistic process. In one worst case, an animator may be forced to use simplified "stand-in" character models to create the initial animation, and then wait to see the resulting animation with the final character model. In this situation, the animator is essentially working blind and can only guess at the final result. Conversely, the additional computing resources needed to process model components in a reasonable time, if even possible, substantially increases the costs of creating animation.

Accordingly, what is desired is to solve one or more of the problems relating to optimizing the performance of model components such that they can be executed in a reasonable time without consuming undue computing resources, some of which may be discussed herein. Additionally, what is desired is to reduce some of the drawbacks relating to optimize any type of model component, regardless of its function or complexity, some of which may be discussed herein.

SUMMARY OF THE DISCLOSURE

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be present some innovations, embodiments, and/or examples found within this disclosure in a simplified form as a prelude to a more detailed description presented later.

Techniques are disclosed for creating posed computer-generated models. In various embodiments, model components can be used to pose character models to create a variety of realistic and artistic effects. In one aspect, behavior of a model component may be analyzed to determine a representation of the model component that closely approximates the output of the model component. The representation of the model component may execute faster than the original model component thereby allowing the model components used to pose a character model to be replaced at animation time by one or more equivalent representations of model components to improve animation performance.

In some embodiments, one or more representations of a model component may be derived from an analysis of the character model manipulated through a set of representative training poses. The one or more representations of a model component may include a set of one or more activation weights used to control generalized or specialized deformers. In one embodiment, a method for creating posed computer-generated models may be implemented by one or more computer systems using a target pose associated with the model. A plurality of weights may be generated that are configured to control a rotation deformer, a squash and stretch deformer, or other specialized deformer based on the set of representative training poses. Each weight in the plurality of weights may be stored in association with a corresponding training pose in the set of training poses.

In various aspects, at least one weight in the determined plurality of weights that are configured to control a rotation deformer, a squash and stretch deformer, or other specialized deformer can be determined and used to approximate the target pose. Information configured for posing the model can be generated based on the determined at least one weight. In one embodiment, a target pose associated with a model may include a simulated pose associated with the model. In another embodiment, a target pose associated with a model may include a sculpted pose associated with the model.

The plurality of weights configured to control a rotation deformer, a squash and stretch deformer, or other specialized deformer may be determined in response to backsolving from a selected training pose in the set of training poses to obtain a weight configured to control a rotation deformer, a squash and stretch deformer, or a specialized deformer associated with the model into deforming the model into the selected training pose. The plurality of weights may be determined in response to evaluating at least one angle associated with a selected training pose in the set of training poses to determine a weight configured to control a rotation deformer or a similarly specialized deformer associated with the model into deforming the model into the selected training pose with the at least one angle. In some embodiments, a weight may be determined in response to averaging a first weight configured to control a rotation deformer or a similarly specialized deformer determined from a training pose in the set of training poses based on at least a first angle associated with the training pose and a second weight configured to control a rotation deformer or a similarly specialized deformer determined from the training pose based on at least at least a second angle associated with the training pose.

In some embodiments, a deformer associated with the model may be driven with a set of defrobulated angles or equivalent (e.g., satisfying a defrobulated form). In further embodiments, a first pose for the model may be created based on a simulation and the determined weight. A second pose for the model may then be created based on the first pose and a sculpted pose for the model.

In another aspect for creating posed computer-generated models, a set of one or more activation weights configured to control a deformer can be determined using interpolation based on at least two samples obtained from one or more poses of the model. Information configured for posing the model may be generated based on one or more of the determined activation weights. In one embodiment, the at least two samples may be generated based on a simulated pose or determined from a sculpted pose. Interpolating the set of one or more activation weights configured to control a deformer may include using a piecewise linear interpolant.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Figure 1:
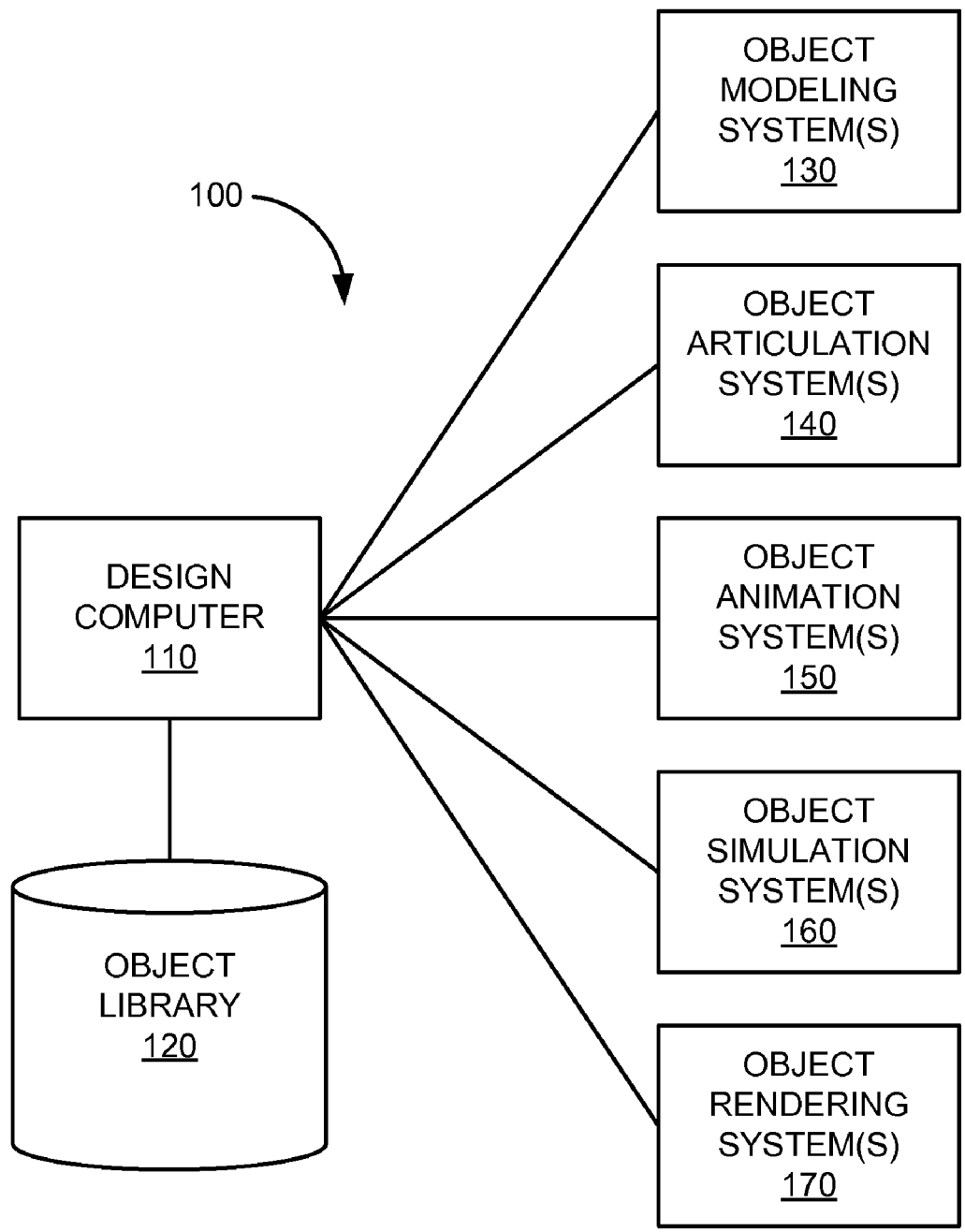
FIG. 1 is a simplified block diagram of a system for creating computer graphics imagery (CGI) and computer-aided animation that may implement or incorporate various embodiments or techniques for rig baking for arbitrary deformers.

FIG. 1 is a simplified block diagram of system 100 for creating computer graphics imagery (CGI) and computer-aided animation that may implement or incorporate various embodiments or techniques for rig baking for arbitrary deformers. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for creating poses associated with computer-generated models.

In various embodiments, model components can be used to pose character models to create a variety of realistic and artistic effects. In one aspect, behavior of a model component may be analyzed to determine a representation of the model component that closely approximates the output of the model component. The representation of the model component may execute faster than the original model component thereby allowing the model components used to pose a character model to be replaced at animation time by one or more equivalent representations of model components to improve animation performance.

In some embodiments, one or more representations of a model component may be derived from an analysis of the character model manipulated through a set of representative training poses. The one or more representations of a model component may include a set of one or more activation weights used to control generalized or specialized deformers. In one embodiment, a method for creating posed computer-generated models may be implemented by one or more computer systems using a target pose associated with the model. A plurality of weights may be generated that are configured to control a rotation deformer, a squash and stretch deformer, or other specialized deformer based on the set of representative training poses. Each weight in the plurality of weights may be stored in association with a corresponding training pose in the set of training poses.

In various aspects, at least one weight in the determined plurality of weights that are configured to control a rotation deformer, a squash and stretch deformer, or other specialized deformer can be determined and used to approximate the target pose. Information configured for posing the model can be generated based on the determined at least one weight. In one embodiment, a target pose associated with a model may include a simulated pose associated with the model. In another embodiment, a target pose associated with a model may include a sculpted pose associated with the model.

Figure 2:
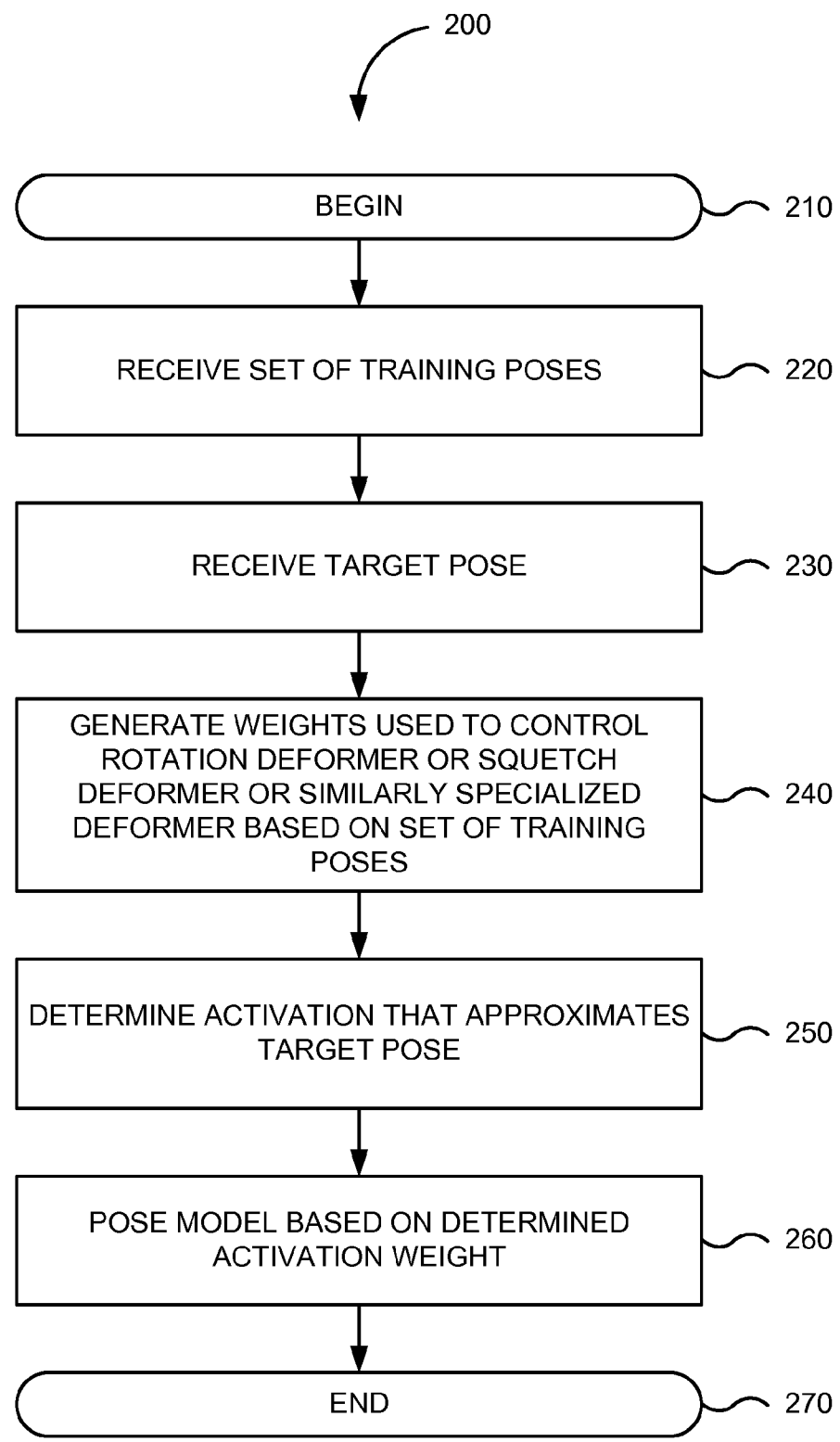
FIG. 2 is a flowchart of a method for creating poses for computer-generated models in accordance with one embodiment.

FIG. 2 is a flowchart of method 200 for creating poses for computer-generated models in accordance with one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a set of one or more training poses is received. Each pose in the set of training poses may be different. For example, one pose may represent a rest pose associated with a computer-generated model. In another example, one pose may represent an initial pose associated with the model. Some poses may represent the model as driven by values of each of a set of different angles along a single axis of rotation. In another example, each pose may represent the position of a portion of a model driven by each of a plurality of different angles along a plurality of axes of rotation.

In step 230, a target pose is received. In various embodiments, a target pose of a computer-generated model may include a simulated pose, a sculpted pose, or the like. The target pose may represent a desired or approximate pose of the model.

In step 240, a plurality of activation weights are generated based on the set of training poses. Activation weights can include data used to control one or more deformers, such as a rotation deformer, a squash and stretch deformer, a similarly specialized deformer, or any arbitrary deformer. Examples of methods for generating activation weights can be found in the applications listed in the "Cross Reference to Related Applications" section.

In step 250, an activation weight is determined from the determined plurality of activation weights that approximates the target pose. In one embodiment, an activation weight may be determined using interpolation. In another embodiment, an activation weight may be determined as a average of one or more activation weight.

In step 260, a pose for a model is created based on the determined activation weight. For example, a deformer may be applied to the model using the determined activation weight to control the deformer to deform the model to create a pose. A deformer controlled by the determined activation weight may include may include a rotate deformer, a squetch (also known as a squash and stretch deformer), or other similarly specialized deformer. In some embodiments, a deformer may be driven by defrobulated angles or their equivalent.

In further embodiments, information configured for posing a computer-generated model may be generated based on the determined activation weight. For example, a simulation pose may be reapplied on top of a determined pose as an offset. In still further embodiments, a sculpted pose may be reapplied on a simulated pose to get a final pose for a model. FIG. 2 ends in step 270.

Figure 3:
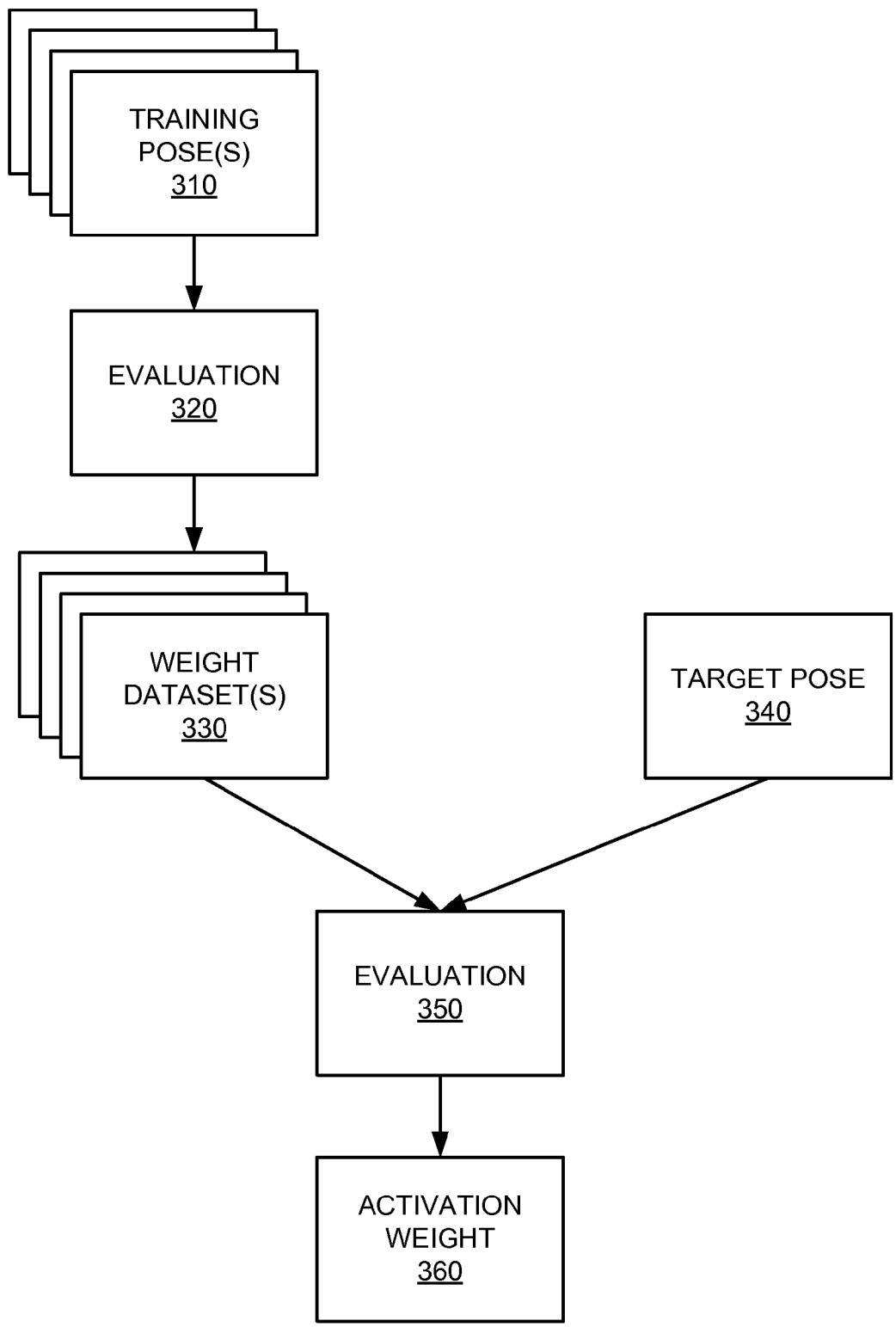
FIG. 3 is a block diagram representing elements of the method of FIG. 3 for determining arbitrary deformer activation weights in accordance with one embodiment.

FIG. 3 is a block diagram representing elements of the method of FIG. 3 for determining arbitrary deformer activation weights in accordance with one embodiment. In this example, FIG. 3 includes a set of one or more training poses 310. One or more of the poses in the set of training poses 310 may represent aspects of a desired character activity, such as walking, running, jumping, talking, facial emotions and expressions, or the like. One or more of the poses in the set of training poses 310 may be preauthored or dynamically determined in response to a wedge, sampling technique, incremental deforming matrix, or the like.

FIG. 3 further includes evaluation step 320. Step 320 may correspond to step 240 of FIG. 2 in that one or more weight datasets 330 are determined or otherwise generated. In some embodiments, each training pose in the set of training poses 310 is evaluated to determine a weight that may be used by or otherwise control a deformer to pose a model as in the training pose. One or more computer systems may be used to backsolve from each training pose in the set of training poses 310 to a determined weight. In one embodiment, for example, each joint angle in a character model represented by a training pose may be evaluated to determine a weight for each individual angle or a weight representing average of at least two angles.

FIG. 3 also includes a target pose 340. Target pose 340 may include information specified by a user of design computer 110 that includes a desired placement of portions of a model. Target pose 340 may include information specifying positions, rotations, bends, angles, squashes, stretches, or the like of a give model.

FIG. 3 further includes evaluation step 350. Step 350 may correspond to step 250 of FIG. 2 in that activation weight 360 is determined from the weight datasets 330 that approximates the target pose. In other words, one or more weights are determined that when used by a deformer pose a computer-generated model in a pose that approximates target pose 340. An activation weight may be determined that provides the closest approximation to target pose 340 in one embodiment. In another embodiment, an activation weight may be determined that provides an approximation to target pose 340 that satisfies a predetermined threshold or other defined criteria.

Therefore, weight datasets 330 may be configured to control a rotation deformer, a squash and stretch deformer, or other specialized deformers. These deformers may execute faster than original model component thereby allowing model components used to pose a character model to be replaced at animation time by one or more equivalent representations of model components to improve animation performance.

Figure 4:
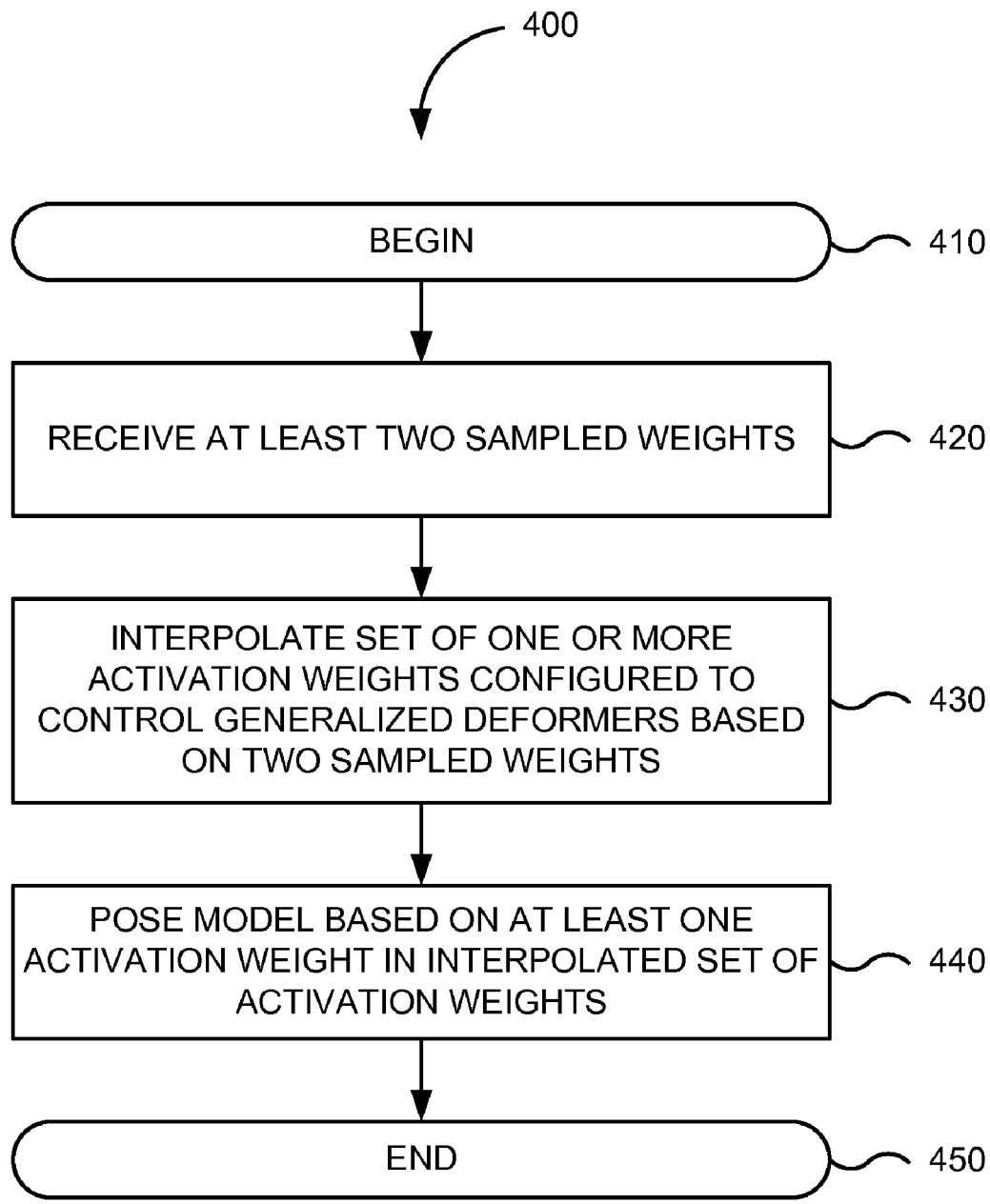
FIG. 4 is a flowchart of a method for determining activations weights using interpolation in accordance with one embodiment.

FIG. 4 is a flowchart of method 400 for determining activations weights using interpolation in accordance with one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

Figure 5A:
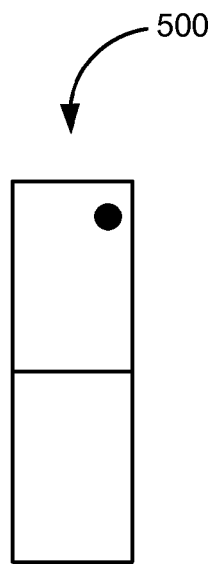
FIGS. 5A, 5B, 5C, and 5D illustrate a linear segmentation technique that may be used as an interpolate in accordance with one embodiment.
Figure 5B:
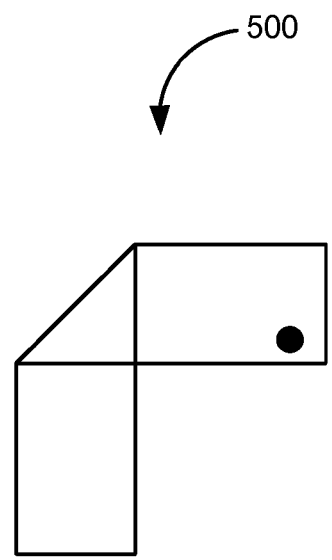
Figure 5C:
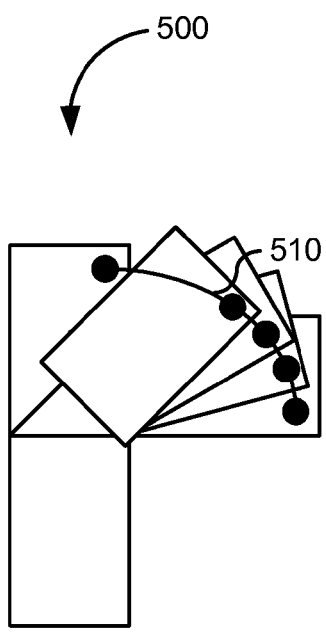
Figure 5D:
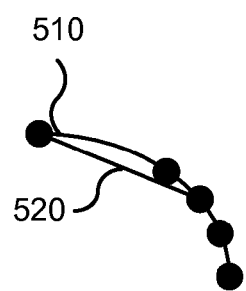

In step 420, at least two sampled weights are received. In various embodiments, a delta between a target pose (or shape) and a simulated pose (or shape) may be used to determine which portions of a computer-generated model have moved between the differing poses or shapes. FIG. 5A illustrates a rest pose of model 500. Model 500 may represent a portion of a character having a joint having a variety of degrees of freedom. FIG. 5B illustrates a sculpted or simulated pose of model 500. As illustrated, there exists a difference between the position of a point on the rest pose of model 500 and the same point on the sculpted or simulated pose of model 500. As shown in FIG. 5C, a rotation of the joint between the two poses in FIGS. 5A and 5B creates an arc 510.

In some embodiments, points may be sampled along arc 510 to determine weights associated with a deformer that deforms the model from one pose to the other. In one example, a wedge of a deformer may be performed. Samples may be taken at periodic intervals during the wedge to generate N samples. The number of samples may be determined based on computational criteria, complexity of the model, or the like. In one example, a deformer may be ramped from 0 to 1 to create a set of N divisions.

In one embodiment, two divisions (or their represented poses) can be selected whose activation weights for the deformer most closely approach a target pose. One interpolation techniques may be used to determine an activation weight based on the two divisions. For example, a piecewise linear interpolant may be used between two sample points forming line 520. Line segments (e.g., line 520) may be determined between any two arbitrary or neighboring divisions. Points on these line segments may be used to determine activation weights that closely approximate the target pose by interpolating between the weights associated with each endpoint. Other types of interpolation may be implemented between at least two samples.

Therefore, activation weights may be readily determined for any arbitrary deformer. These deformers may execute faster than original model component thereby allowing model components used to pose a character model to be replaced at animation time by one or more equivalent representations of model components to improve animation performance.

Figure 6:
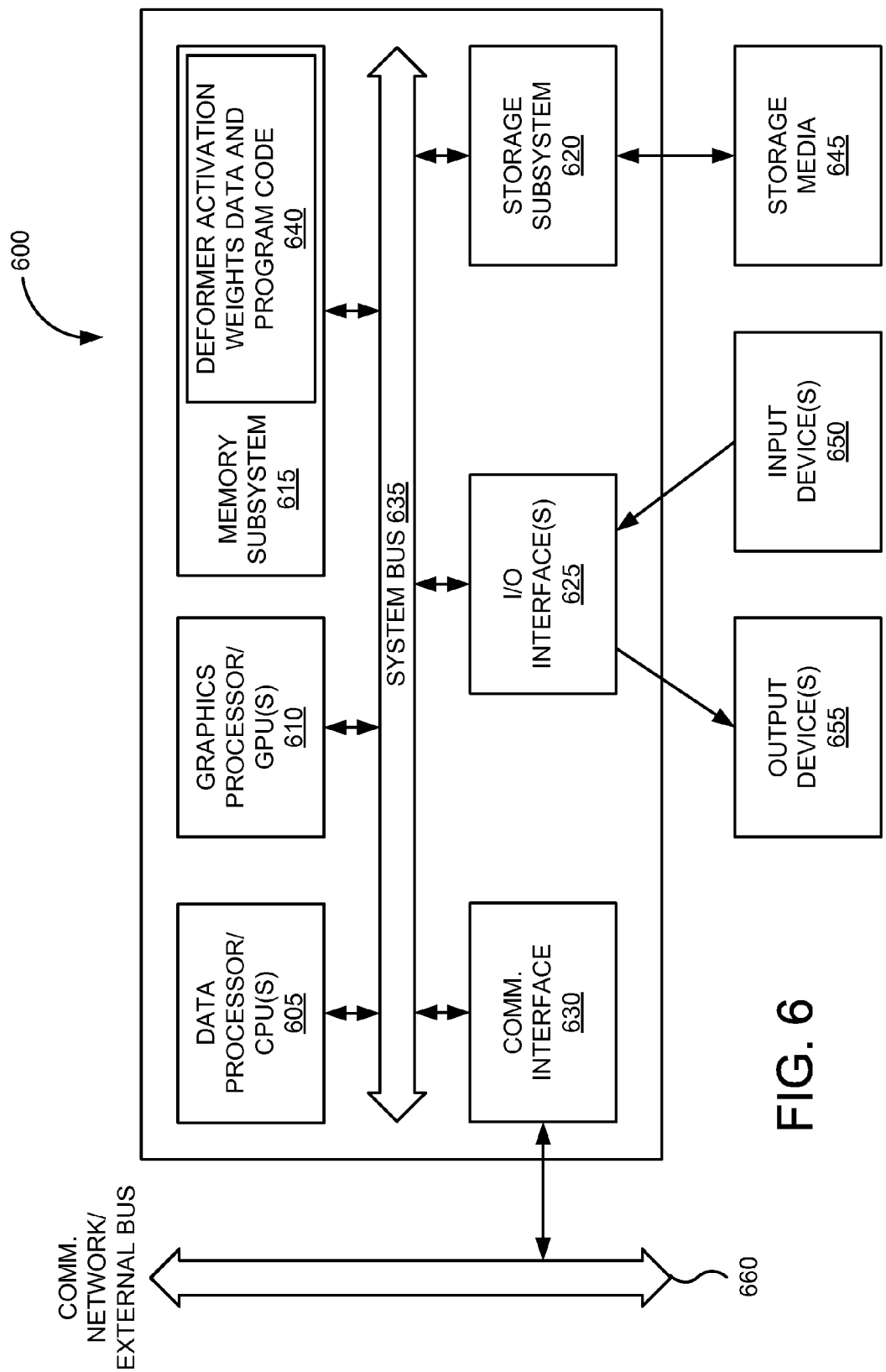
FIG. 6 is a block diagram of a computer system or information processing device that may incorporate an embodiment, be incorporated into an embodiment, or be used to practice any of the innovations, embodiments, and/or examples found within this disclosure.

FIG. 6 is a block diagram of computer system 600 that may incorporate an embodiment, be incorporated into an embodiment, or be used to practice any of the innovations, embodiments, and/or examples found within this disclosure. FIG. 6 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 600 can include hardware and/or software elements configured for performing logic operations and calculations, input/output operations, machine communications, or the like. Computer system 600 may include familiar computer components, such as one or more one or more data processors or central processing units (CPUs) 605, one or more graphics processors or graphical processing units (GPUs) 610, memory subsystem 615, storage subsystem 620, one or more input/output (I/O) interfaces 625, communications interface 630, or the like. Computer system 600 can include system bus 635 interconnecting the above components and providing functionality, such connectivity and inter-device communication. Computer system 600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 605 can include hardware and/or software elements configured for executing logic or program code or for providing application-specific functionality. Some examples of CPU(s) 605 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 605 may also include one or more field-gate programmable arrays (FPGAs), application-specific integrated circuits (ASICs), or other microcontrollers. The one or more data processors or central processing units (CPUs) 605 may include any number of registers, logic units, arithmetic units, caches, memory interfaces, or the like. The one or more data processors or central processing units (CPUs) 605 may further be integrated, irremovably or moveably, into one or more motherboards or daughter boards.

The one or more graphics processor or graphical processing units (GPUs) 610 can include hardware and/or software elements configured for executing logic or program code associated with graphics or for providing graphics-specific functionality. GPUs 610 may include any conventional graphics processing unit, such as those provided by conventional video cards. Some examples of GPUs are commercially available from NVIDIA, ATI, and other vendors. In various embodiments, GPUs 610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 610 may include any number of registers, logic units, arithmetic units, caches, memory interfaces, or the like. The one or more data processors or central processing units (CPUs) 605 may further be integrated, irremovably or moveably, into one or more motherboards or daughter boards that include dedicated video memories, frame buffers, or the like.

Memory subsystem 615 can include hardware and/or software elements configured for storing information. Memory subsystem 615 may store information using machine-readable articles, information storage devices, or computer-readable storage media. Some examples of these articles used by memory subsystem 670 can include random access memories (RAM), read-only-memories (ROMS), volatile memories, non-volatile memories, and other semiconductor memories. In various embodiments, memory subsystem 615 can include deformer activation weights data and program code 640.

Storage subsystem 620 can include hardware and/or software elements configured for storing information. Storage subsystem 620 may store information using machine-readable articles, information storage devices, or computer-readable storage media. Storage subsystem 620 may store information using storage media 645. Some examples of storage media 645 used by storage subsystem 620 can include floppy disks, hard disks, optical storage media such as CD-ROMS, DVDs and bar codes, removable storage devices, networked storage devices, or the like. In some embodiments, all or part of deformer activation weights data and program code 640 may be stored using storage subsystem 620.

In various embodiments, computer system 600 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system. Computer system 600 may also include one or more applications configured to executed, perform, or otherwise implement techniques disclosed herein. These applications may be embodied as deformer activation weights data and program code 640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 615 and/or storage subsystem 620.

The one or more input/output (I/O) interfaces 625 can include hardware and/or software elements configured for performing I/O operations. One or more input devices 650 and/or one or more output devices 655 may be communicatively coupled to the one or more I/O interfaces 625.

The one or more input devices 650 can include hardware and/or software elements configured for receiving information from one or more sources for computer system 600. Some examples of the one or more input devices 650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 650 may allow a user of computer system 600 to interact with one or more non-graphical or graphical user interfaces to enter a comment, select objects, icons, text, user interface widgets, or other user interface elements that appear on a monitor/display device via a command, a click of a button, or the like.

The one or more output devices 655 can include hardware and/or software elements configured for outputting information to one or more destinations for computer system 600. Some examples of the one or more output devices 655 can include a printer, a fax, a feedback device for a mouse or joystick, external storage systems, a monitor or other display device, a communications interface appropriately configured as a transceiver, or the like. The one or more output devices 655 may allow a user of computer system 600 to view objects, icons, text, user interface widgets, or other user interface elements.

A display device or monitor may be used with computer system 600 and can include hardware and/or software elements configured for displaying information. Some examples include familiar display devices, such as a television monitor, a cathode ray tube (CRT), a liquid crystal display (LCD), or the like.

Communications interface 630 can include hardware and/or software elements configured for performing communications operations, including sending and receiving data. Some examples of communications interface 630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 630 may be coupled to communications network/external bus 680, such as a computer network, to a FireWire bus, a USB hub, or the like. In other embodiments, communications interface 630 may be physically integrated as hardware on a motherboard or daughter board of computer system 600, may be implemented as a software program, or the like, or may be implemented as a combination thereof.

In various embodiments, computer system 600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 600.

As suggested, FIG. 6 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for creating posed computer-generated models, the method comprising:
    receiving, at one or more computer systems, information specifying a first set of one or more poses associated with a model;
    receiving, at the one or more computer systems, information specifying a second set of one or more poses associated with the model;
    generating, with one or more processors associated with the one or more computer systems, a plurality of weights configured to control a rotation deformer, a squash and stretch deformer, or a specialized deformer based on the first set of poses associated with the model;
    storing, in a storage device associated with the one or more computer system, each weight in the plurality of weights in association with a corresponding pose in the first set of poses associated with the model;
    determining, with the one or more processors associated with the one or more computer systems, at least one weight in the stored plurality of weights configured to control a rotation deformer, a squash and stretch deformer, or a specialized deformer to approximate at least one pose in the second set of poses associated with the model; and
    generating, with the one or more processors associated with the one or more computer systems, information configured for posing the model based on the determined at least one weight;
    wherein generating, with the one or more processors associated with the one or more computer systems, the plurality of weights comprises averaging a first weight configured to control a rotation deformer or a similarly specialized deformer determined from a selected training pose in the first set of poses associated with the model based on at least a first angle associated with the training pose and a second weight configured to control a rotation deformer or a similarly specialized deformer determined from the training pose based on at least at least a second angle associated with the training pose.

2. The method of claim 1 wherein receiving, at the one or more computer systems, the information specifying the second set of poses associated with the model comprises receiving a simulated pose associated with the model.

3. The method of claim 1 wherein receiving, at the one or more computer systems, the information specifying the second set of poses associated with the model comprises receiving a sculpted pose associated with the model.

4. The method of claim 1 wherein generating, with the one or more processors associated with the one or more computer systems, the plurality of weights comprises backsolving from a selected training pose in the first set of poses associated with the model to obtain a weight configured to control a rotation deformer, a squash and stretch deformer, or a specialized deformer associated with the model into deforming the model toward the selected training pose.

5. The method of claim 1 wherein generating, with the one or more processors associated with the one or more computer systems, the plurality of weights comprises evaluating at least one angle associated with a selected training pose in the first set of poses associated with the model to determine a weight configured to control a rotation deformer or a similarly specialized deformer associated with the model into deforming the model toward the selected training pose with the at least one angle.

6. The method of claim 1 wherein a rotation deformer or a specialized deformer associated with the model is driven with a set of defrobulated angles or information satisfying a defrobulated form.

7. The method of claim 1 wherein generating, with the one or more processors associated with the one or more computer systems, information configured for posing the model based on the determined at least one weight comprises:
generating a first pose for the model based on a simulation and the determined weight; and
generating a second pose for the model based on the first pose and a sculpted pose for the model.

8. A non-transitory computer-readable medium storing code configured to direct one or more processors associated with one or more computer systems for creating posed computer-generated models, the non-transitory computer-readable medium comprising:
code for receiving information specifying a first set of one or more poses associated with a model;
code for receiving information specifying a second set of one or more poses associated with the model;
code for generating a plurality of weights configured to control a rotation deformer, a squash and stretch deformer, or a specialized deformer based on the first set of poses associated with the model;
code for storing each weight in the plurality of weights in association with a corresponding pose in the first set of poses associated with the model;
code for determining at least one weight in the stored plurality of weights configured to control a rotation deformer, a squash and stretch deformer, or a specialized deformer to approximate at least one pose in the second set of poses associated with the model; and
code for generating information configured for posing the model based on the determined at least one weight;
wherein the code for generating the plurality of weights comprises code for averaging a first weight configured to control a rotation deformer or a similarly specialized deformer determined from a selected training pose in the first set of poses associated with the model based on at least a first angle associated with the training pose and a second weight configured to control a rotation deformer or a similarly specialized deformer determined from the training pose based on at least at least a second angle associated with the training pose.

9. The non-transitory computer-readable medium of claim 8 wherein the code for receiving the information specifying the second set of poses associated with the model comprises code for receiving a simulated pose associated with the model.

10. The non-transitory computer-readable medium of claim 8 wherein the code for receiving the information specifying the second set of poses associated with the model comprises code for receiving a sculpted pose associated with the model.

11. The non-transitory computer-readable medium of claim 8 wherein the code for generating the plurality of weights comprises code for backsolving from a selected training pose in the first set of poses associated with the model to obtain at least one weight in the plurality of weights configured to control the rotation deformer into deforming the model toward the selected training pose.

12. The non-transitory computer-readable medium of claim 8 wherein the code for generating the plurality of weights comprises evaluating at least one angle associated with a selected training pose in the first set of poses associated with the model to obtain at least one weight in the plurality of weights configured to control the rotation deformer into deforming the model toward the selected training pose with the at least one angle.

13. The non-transitory computer-readable medium of claim 8 wherein the rotation deformer is driven with a set of defrobulated angles or information satisfying a defrobulated form.

14. The non-transitory computer-readable medium of claim 8 wherein the code for generating the information configured for posing the model based on the determined at least one weight comprises:
code for generating a first pose for the model based on a simulation and the determined at least one weight; and
code for generating a second pose for the model based on the first pose and a sculpted pose for the model.

15. A system for creating posed computer-generated models, the system comprising:
a processor; and
a memory, in communication with the processor, configured to store a set of instructions which when executed by the processor configured the processor to:
receive information specifying a first set of one or more poses associated with a model;
receive information specifying a second set of one or more poses associated with the model;
generate a plurality of weights configured to control a rotation deformer, a squash and stretch deformer, or a specialized deformer based on the first set of poses associated with the model;
storing each weight in the plurality of weights in association with a corresponding pose in the first set of poses associated with the model;
determine at least one weight in the stored plurality of weights configured to control a rotation deformer, a squash and stretch deformer, or a specialized deformer to approximate at least one pose in the second set of poses associated with the model; and
generate information configured for posing the model based on the determined at least one weight;

wherein to generate the plurality of weights the processor is configured to average a first weight configured to control a rotation deformer or a similarly specialized deformer determined from a selected training pose in the first set of poses associated with the model based on at least a first angle associated with the training pose and a second weight configured to control a rotation deformer or a similarly specialized deformer determined from the training pose based on at least at least a second angle associated with the training pose.

16. The system of claim 15 wherein the set of instructions further configure the processor to determine the at least one weight in the plurality of weights that approximates the at least one pose in the second set of poses associated with the model based on a simulated pose associated with the model.

17. The system of claim 15 wherein the set of instructions further configure the processor to determine the at least one weight in the plurality of weights that approximates the at least one pose in the second set of poses associated with the model based on a sculpted pose associated with the model.

18. The system of claim 15 wherein the set of instructions further configure the processor to backsolve from a selected training pose in the first set of poses associated with the model to obtain at least one weight in the plurality of weights configured to control the rotation deformer into deforming the model toward the selected training pose.

19. The system of claim 15 wherein the set of instructions further configure the processor to evaluating at least one angle associated with a selected training pose in the first set of poses associated with the model to obtain at least one weight in the plurality of weights configured to control the rotation deformer into deforming the model toward the selected training pose with the at least one angle.

20. The system of claim 15 wherein the rotation deformer is driven with a set of defrobulated angles or information satisfying a defrobulated form.

21. The system of claim 15 wherein to generate the information configured for posing the model based on the determined at least one weight, the set of instructions further configure the processor to:
  generate a first pose for the model based on a simulation and the determined at least one weight; and
  generate a second pose for the model based on the first pose and a sculpted pose for the model.

* * * * *